(12) United States Patent
Hebard et al.

(10) Patent No.: X8836
(45) Date of Patent: May 22, 1835

(54) COOLER, FLOUR

(76) Inventors: Joseph Hebard; ,John B. Catlin; Thomas G. Abell

Joseph Hebard & John B. Catlin & Thos G. Abell
of Pomfret in the County of Chautauque State of New York Letters Patent The schedule referred to in these Letters Patent and making
part of the same, containing a description in the words of
the said Joseph Hebard and John B. Catlin & Thomas G. Abell
themselves of their improvement in the cooler for cooling flour and
separating the course bran before the flour passes into the bolter
called Hebbards, Catlins and Abells improved cooler To all to whom these presents shall come
Joseph Hebbard John B. Catlin & Thomas G. Abell of
Pomfret in the county of Chautauque and State of New
York send Greeting
Be it known that we the said Joseph Hebbard, John B.
Catlin & Thomas G. Abell have invented, constructed, made
and applied to use a new and useful cooler for cooling
flour, and separating the course bran from the flour while
in the operation of cooling and before the flour passes into
the bolter called Hebbards Catlins and Abells improved
cooler, and the following is a full and exact description of
the same as invented by us. The improved Cooler consists
of a rolling screen or shaking sive which receives the ground
grain or meal from the elevators by means of a common
conveyor instead of having it conveyed to hopper boys as is
usually the case the conveyor which receives the meal from
the elevators and conveys it into the screen; the spout which
conducts the course bran from the screen, conveyors which are
placed under the screen and receive the meal after it is
separated from the course bran and conducts it back and
forth through the machine a sufficient number of times to cool it (in the one now in use once only) a spout which receives the meal from the end of the last conveyor, & through which it falls into the bolter, and a case which covers the whole except the first conveyor, with standing sides to direct the meal which falls, or is sifted through the screen into the last conveyor 1. The screen is made after the manner of a common bolter with six sides and is composed of or covered with iron wire of a proper texture to retain the course bran, and to permit the rest of the meal to pass or be sifted through it. The screen rolls with the shaft to which it is attached and which according to the above description composes a part of the machine which we call the screen, On one end of the shaft is a common conveyor which receives the meal from the elevators and by its rotary motion conducts it within the screen whence by the same motion it is sifted through the screen, except the course bran which is carried thro the whole length of the screen and discharged into a spout at the opposite end from that into which it was received. The screen now used by us is eight feet long and twenty six inches in diameter and made of or covered with iron wire, but the length and diameter may be varied according to circumstances, and it may also be made of or covered with any other suitable material than iron wire though we now know of nothing better 2? the conveyor which receives the meal from the elevators and which is the end of the shaft on which the screen turns, runs in an appropriate spout or case and is about three feet long but its length may be varied according to circumstances It must be sufficiently long to reach from the elevators into the screen and deposite the meal there, The said screen and conveyor are placed nearly horizontal having a sufficient inclination to give progress to the meal which is received into one end of the screen from the conveyor. and to discharge the course bran into a
spout at the opposite end as common bolting operate —
3^d Directly under the screen is another conveyor made in the
common form of the same length of the screen, into which the meal
which is sifted through the screen falls, being directed by two boards
of the same length and of proper width placed horizontally and
parallel to each other, the lower edges of which meet and are worked
so as to make a trough for & to direct or guide all the meal through
the conveyor, and the upper edges of which are far enough apart
to receive all the meal which is sifted through the screen, From
the lower end of this conveyor the meal falls into a screw having
an opposite direction & made in the same manner, and from the
inclined end of this it falls into a third, having an opposite incli-
nation to the last and made in the same manner and from the
inclined end of this third conveyor is a spout which receives
the same and conducts it into the bolter, The meal after
being separated from the course bran (which is done while warm)
is thus carried through the whole length of the machine by the
three sets of conveyors for the purpose of rendering it perfectly Cool
before entering the bolter, Any number of conveyors may be
used as may be necessary and convenient, In ordinary Mills
one is sufficient and the length of the screen and conveyor under-
neath may be increased so as to have one conveyor sufficiently
cool the flour in all cases, Those now in use have one conveyor
under the screen only and from six to eight feet in length as above
mentioned, — This size and length with one conveyor underneath
only is sufficient for two run of stones, Motion is given to
the screen and conveyors by such kinds of gearing or machinery
as the constructor shall prefer, or as is commonly used in such
cases, 4. The screen and conveyor or conveyors underneath are
covered with or inclosed in a case, (with sufficient opening to
admit the air) to screen the meal, from the dust and filth of
a Mill, and from any current of wind that might blow, it away or waste it, The whole is [illegible] with three sets of con-
-veyors by a mould made in a screen sufficiently large, herewith
transmitted and a drawing hereunto annexed. The benefits
and advantages of the above invention are principally the
following 1. It saves the expence of hopper boys and the apa-
ratus to conduct the meal to and from them as made in the
usual way. 2 It saves some expence in making the coarse
end of the bolter which is nearly equal to the screen of the
improved cooler. 3. by taking out the course bran before
the meal passes into the bolter from one to three pounds of
flour is procured from each bushel of wheat more than is pro-
cured in the usual way is probably prevented from being sifte
through the bolter by the coarse bran or adheres to the coarse
bran in its passage through the bolter. 4 By seperating
the coarse bran from the flour before it passes into the bolter
it saves the bolter from the friction and wear [illegible] the coarse
bran. — In testimony that the above is a true specification
of our said improvement as above described we have hereunto
set our hands and seals the seventeenth day of February eighteen
hundred and thirty five —

Joseph Hebard
John B. Catlin
Thos G. Abell

Witnesses
W. Walworth
L. Hanham

[illegible]

(1404 wds)